(12) United States Patent
Ido et al.

(10) Patent No.: US 7,716,568 B2
(45) Date of Patent: May 11, 2010

(54) DISPLAY APPARATUS AND MEDIA DISPLAY METHOD

(75) Inventors: Daiji Ido, Shinagawa-ku (JP); Takao Yamaguchi, Neyagawa (JP); Junichi Sato, Machida (JP); Tomoaki Itoh, Shinagawa-ku (JP); Ichiro Takei, Ota-ku (JP)

(73) Assignee: Panasonic Corporation, Tokyo (JP)

( * ) Notice: Subject to any disclaimer, the term of this patent is extended or adjusted under 35 U.S.C. 154(b) by 192 days.

(21) Appl. No.: 10/570,276

(22) PCT Filed: Aug. 26, 2004

(86) PCT No.: PCT/JP2004/012259
§ 371 (c)(1),
(2), (4) Date: Mar. 2, 2006

(87) PCT Pub. No.: WO2005/025206
PCT Pub. Date: Mar. 17, 2005

(65) Prior Publication Data
US 2007/0046700 A1    Mar. 1, 2007

(30) Foreign Application Priority Data
Sep. 5, 2003   (JP)   ............... 2003-313741

(51) Int. Cl.
*G06F 17/00*   (2006.01)
(52) U.S. Cl. .................. 715/204; 345/698; 715/235
(58) Field of Classification Search ................. 345/698; 715/204, 235
See application file for complete search history.

(56) References Cited

U.S. PATENT DOCUMENTS 5,796,401 A * 8/1998 Winer .................. 345/619

(Continued)

FOREIGN PATENT DOCUMENTS

JP           11175515        7/1999

(Continued)

OTHER PUBLICATIONS

PCT International Search Report dated Nov. 22, 2004.

(Continued)

*Primary Examiner*—William L Bashore
*Assistant Examiner*—Gregory A Distefano
(74) *Attorney, Agent, or Firm*—Dickinson Wright PLLC (57) ABSTRACT

A media receiving apparatus capable of preventing media from being positioned in an invalid display area or a program from being temporarily stopped, even if the vertical/horizontal ratio of the resolution of the display section is switched while a broadcast or streaming program is being displayed. In this apparatus there are a plurality of display sections D1 and D2 with different resolutions, and a display directive section (303) directs a display section to be set as active in accordance with the mode of use of the user. A layout information selection section (304) selects a layout corresponding to the resolution of the display section indicated by the display directive section (303) from layout information that includes layouts corresponding to display sections D1 and D2 distributed from a media distribution apparatus, and in accordance with the selected layout a media display control section (306) selects media distributed from the media distribution apparatus, performs conversion processing comprising enlargement or reduction, and displays media on the display section designated by the display directive section (303).

2 Claims, 11 Drawing Sheets

U.S. PATENT DOCUMENTS

| | | | |
|---|---|---|---|
| 6,023,714 A * | 2/2000 | Hill et al. | 715/235 |
| 6,477,549 B1 | 11/2002 | Hishida et al. | |
| 6,711,448 B2 * | 3/2004 | Misawa et al. | 700/83 |
| 6,750,830 B1 * | 6/2004 | Teshima et al. | 345/1.2 |
| 6,766,181 B1 * | 7/2004 | Newman et al. | 455/575.3 |
| 7,210,099 B2 * | 4/2007 | Rohrabaugh et al. | 715/249 |
| 7,234,111 B2 * | 6/2007 | Chu et al. | 715/251 |
| 7,287,220 B2 * | 10/2007 | Kaasila et al. | 715/201 |
| 7,392,483 B2 * | 6/2008 | Wong et al. | 715/746 |
| 2001/0022590 A1 | 9/2001 | Banno | |
| 2002/0045467 A1 * | 4/2002 | Hama | 455/567 |
| 2003/0013417 A1 * | 1/2003 | Bum | 455/90 |
| 2003/0064762 A1 * | 4/2003 | Tanabe et al. | 455/575 |
| 2003/0095135 A1 * | 5/2003 | Kaasila et al. | 345/613 |
| 2003/0153283 A1 | 8/2003 | Kuwazoe | |
| 2003/0177501 A1 * | 9/2003 | Takahashi et al. | 725/110 |

FOREIGN PATENT DOCUMENTS

| | | |
|---|---|---|
| JP | 2001257794 | 9/2001 |
| JP | 2001306387 | 11/2001 |
| JP | 2002312090 | 10/2002 |
| JP | 2003209602 | 7/2003 |

OTHER PUBLICATIONS

Chinese Office Action dated Feb. 9, 2007 with English translation.

Japanese Office Action dated Jan. 30, 2007 with English translation.

\* cited by examiner

PRIOR ART
FIG.1

| (行) | | |
|---|---|---|
| 1 | `<smil>` | INDICATES AN SMIL DOCUMENT. |
| 2 | `<head>` | INFORMATION UNRELATED TO TIME IS WRITTEN IN "head". |
| 3 | `<layout>` | DEFINES LOCATION AND SIZE FOR POSITIONING CONTENT. |
| 4 | `<root-layout width="320" height="480" />` | |
| 5 | `<region id="v" top="5" />` | DEFINES EACH v REGION. |
| 6 | `<region id="t" top="10" />` | DEFINES EACH t REGION. |
| 7 | `<region id="i" top="20" />` | DEFINES EACH i REGION. |
| 8 | `</layout>` | |
| 9 | `</head>` | |
| 10 | `<body>` | TIME-RELATED INFORMATION IS WRITTEN IN "body". |
| 11 | `<par>` | |
| 12 | `<video region="v" src="rtsp://server/sample.mp4/track-ID=1 begin="3s" end="20s" />` | |
| 13 | `<audio src="rtsp://server/sample.mp4/track-ID=2 begin="3s" end="20s" />` | |
| 14 | `<text region="t" src="http://server/text.txt" dur="10s" />` | |
| 15 | `<image region="i" src="http://server/image.jpg" dur="10s" />` | |
| 16 | `</par>` | |
| 17 | `</body>` | |
| 18 | `</smil>` | INDICATES END OF AN SMIL DOCUMENT. |

PRIOR ART

```
...
<switch>
<layout systemScreenSize= "240X320" >
  <root-layout width= "240" height= "320" />
  <region id= "v" top= "100" left= "20" width= "160" height= "120" />
  <region id= "t" top= "270" left= "20" width= "160" height= " 50" />
  <region id= "i" top= " 20" left= "20" width= "160" height= " 30" />
</layout>
<layout systemScreenSize= "160X96" >
  <root-layout width= "160" height= "96" />
  <region id= "v" top= " 5" left= "10" width= "60" height= "45" />
  <region id= "t" top= "70" left= "70" width= "80" height= "25" />
  <region id= "i" top= " 5" left= "70" width= "80" height= "15" />
</layout>
</switch>
...
```

```
...
<switch>
<layout systemScreenSize= "240X320" >
    <root-layout width= "240" height= "320" />
    <region id= "v" top= "100" left= "20" width= "160" height= "120" />
    <region id= "t" top= "270" left= "20" width= "160" height= " 50" />
    <region id= "i" top= " 20" left= "20" width= "160" height= " 30" />
</layout>
<layout systemScreenSize= "160X96" >
    <root-layout width= "160" height= "96" />
    <region id= "v" top= " 5" left= "10" width= "60" height= "45" />
    <region id= "t" top= " 5" left= "70" width= "80" height= "25" />
    <region id= "i" top= "70" left= "70" width= "80" height= "15" />
</layout>
<layout systemScreenSize= "96X48" >
    <root-layout width= "96" height= "48" />
    <region id= "t" top= "20" left= "10" width= "80" height= "25" />
    <region id= "i" top= " 5" left= "5"  width= "80" height= "15" />
</layout>
</switch>
...
```

```
<layout>
    <root-layout width="240" height="320" />
    <region id="v" top="100" left="20" width="160" height="120" />
    <region id="t" top="270" left="20" width="160" height="50" />
    <region id="i" top="20" left="20" width="160" height="30" />
</layout>
```

FIG.10

DISPLAY APPARATUS AND MEDIA DISPLAY METHOD

TECHNICAL FIELD

The present invention relates to a media receiving apparatus that receives various kinds of media data, a media receiving method, and a media distribution system.

BACKGROUND ART

Currently, there is a technology called SMIL (Synchronized Multimedia Integration Language) as a method of integrating media including text data, still-image data, video data, voice data, and music data, and describing its spatial and temporal arrangement, standardized by the W3C (World Wide Web Consortium).

Here, still-image data denotes JPEG, PNG (Portable Network Graphics format) or suchlike bit-mapped compressed data and SVG (Scalable Vector Graphics) or suchlike vector type compressed data; video data denotes compressed data using the MPEG-4 or H.264 system; voice data denotes compressed data using the G.729 or AMR (Adaptive. Multi-Rate) system; and music data denotes compressed data using the MP3 or MIDI system.

Hereinafter, text data, still-image data, video data, voice data, and music data are referred to generically as media data.

SMIL is a descriptive language similar to the hypertext descriptive language HTML (Hyper Text Markup Language) currently extremely widely used through the Internet, and is better suited to distributing multimedia data including video data.

Hereinafter, a method will be described, using the accompanying drawings, whereby multimedia data described by means of SMIL and held on a server is distributed to a client via a network.

Figure 1:
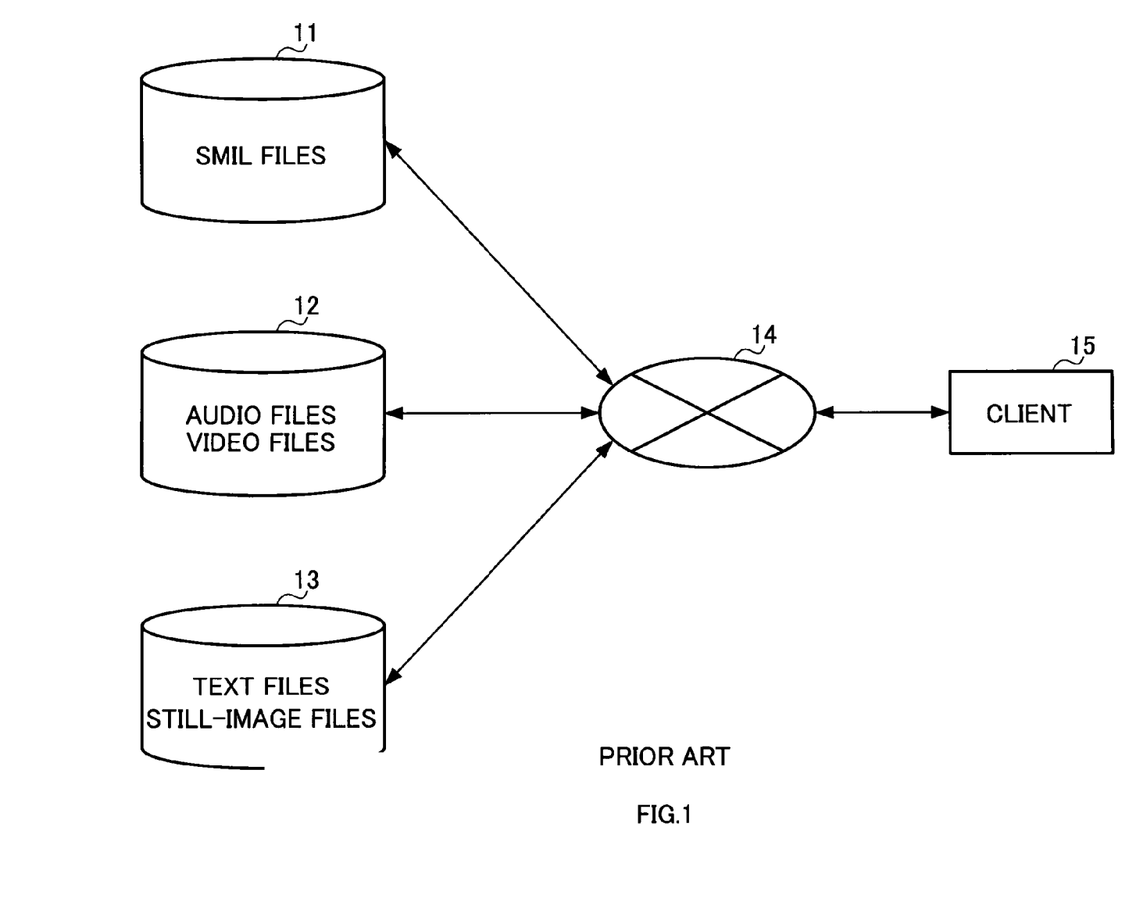
FIG. 1 is a configuration diagram of a conventional media data distribution system.

FIG. 1 is a configuration diagram of a conventional media data distribution system. In this diagram, server 11 stores SMIL files, server 12 stores audio files and video image files, and server 13 stores text files and still-image files. Servers 11 through 13 and client 15 are mutually connected via network 14.

Client 15 accesses server 11 storing SMIL files using a communication protocol such as HTTP (Hyper Text Transfer Protocol), and acquires an SMIL file in which media are described. Client 15 decodes the acquired SMIL file, and acquires the respective media data stored therein—that is, text data, still-image data, video data, audio data, and so forth. Specifically, video data and audio data are acquired from server 12, and text data and still-image data are acquired from server 13.

Based on space and time information written in the acquired SMIL file, client 15 plays back the respective media data (video data, audio data, text data, and/or still-image data) at an appropriate location and appropriate time. SMIL data and the various kinds of media data may also be stored in the same server.

Figure 2:
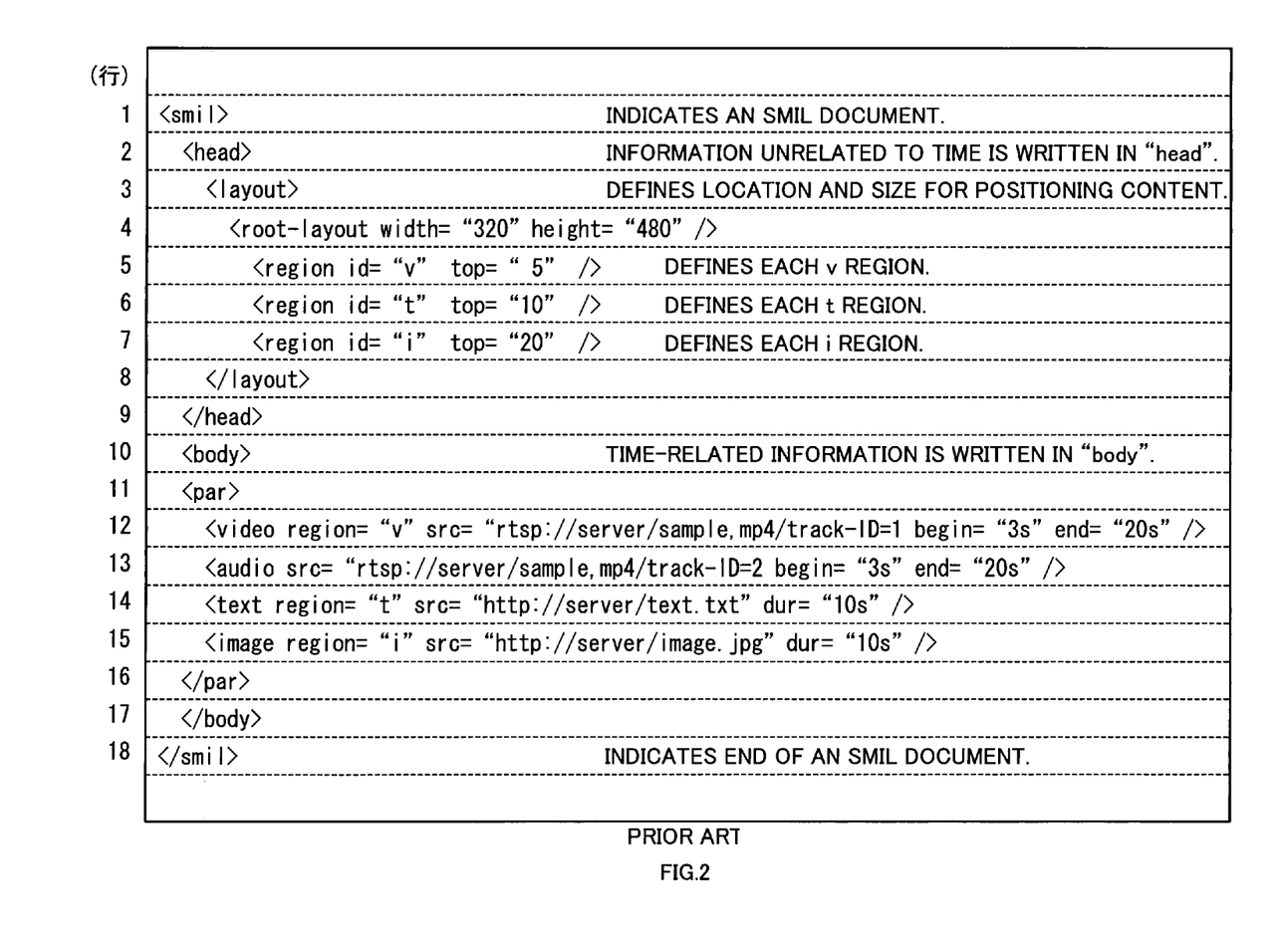
FIG. 2 is a drawing showing an example of a conventional SMIL file description.

Next, a sample SMIL file description will be described using an accompanying drawing. FIG. 2 is a drawing showing an example of a conventional SMIL file description. In this drawing, <smil> in line 1 indicates that this is an SMIL document, and </smil> in line 18 indicates the end of the SMIL document.

The area from <head> in line 2 to </head> in line 9 is an area in which time-unrelated information is written, and here, information showing the spatial layout of the media is written in the area from <layout> in line 3 to </layout> in line 8.

The area from <body> in line 10 to </body> in line 17 is an area in which time-related information is written, and here, information showing the media playback time is written in the area from <par> in line 11 to </par> in line 16.

To give a more concrete explanation, lines 5 through 7 define areas v, t, and i in which video data, text data, and still-image data respectively are positioned, and lines 12 through 15 define time information for playback of video data, voice data, text data, and still-image data respectively.

Item "src=" in each of lines 12 through 15 specifies a URL (Uniform Resource Locator) for acquiring media data. In this example, video data and voice data are specified as being acquired by means of the RTSP (Real Time Streaming Protocol) protocol and text data and still-image data are specified as being acquired by means of the HTTP protocol.

Item "region=" specifies a location where media data is displayed, and corresponds to a region specified inline 5 through line 7. For example, text data specified in line 14 has a "region=t" specification, and therefore corresponds to the region specified in line 6.

By using SMIL in this way, a content provider can freely describe the layout of media to be distributed.

Next, a method of changing the layout of distributed media during reception of distributed data will be described. According to Patent Literature 1, various control buttons for moving or eliminating (erasing) media being displayed are provided as appropriate in a screen displaying media. By manipulating these buttons, a user can change the layout smoothly without interrupting the display of information.

Patent Literature 1: Unexamined Japanese Patent Publication No. 2002-312090

DISCLOSURE OF INVENTION

Problems to be Solved by the Invention

However, there is a problem with a conventional media distribution system as described below. Namely, with a media receiving apparatus of an information terminal apparatus (such as a folding mobile phone, for example) that has a plurality of liquid crystal or such like display screens (hereinafter referred to as "display sections"), for example, if the displaying display section is switched to a display section of different resolution by user manipulation during reception of media that is highly real-time in nature (hereinafter referred to as "real-time media") such as a broadcast or streaming program, the media is not positioned appropriately, and media may be positioned in an invalid area of the display section, or program viewing may have to be stopped temporarily.

Also, even if a method is adopted whereby a user changes the layout by manipulating buttons by means of the method described in above Patent Literature 1, with a small information terminal apparatus such as a mobile phone the lack of an input device such as a mouse provided with a normal PC makes it difficult for the user to change the layout appropriately by manipulating buttons displayed in the display section.

It is an object of the present invention to provide a media receiving apparatus, media receiving method, and media distribution system that display media in a valid display area and prevent a program from being temporarily stopped even when the resolution of a display section is switched during display of real-time media such as a broadcast or streaming program.

Means for Solving the Problems

A media receiving apparatus of the present invention employs a configuration equipped with a display section whose resolution can be switched, a receiving section that receives one or more media data and a plurality of layout information items, a layout information selection section that selects layout information from among the aforementioned layout information corresponding to the resolution displayed by the aforementioned display, and a media display control section that performs control so that media data selection or conversion processing is performed, and media data is displayed on a display section of applicable resolution, based on layout information selected by the aforementioned layout information selection section.

EFFECTS OF THE INVENTION

According to the present invention, a media receiving apparatus that has a display section whose resolution can be switched can display media in a valid display area and prevent a program from being temporarily stopped by dynamically switching the layout of the displaying display section based on layout information corresponding to the display section resolution.

MODES FOR CARRYING OUT THE INVENTION

Embodiments of the present invention will be described below with reference to the accompanying drawings.

Embodiment 1

Figure 3:
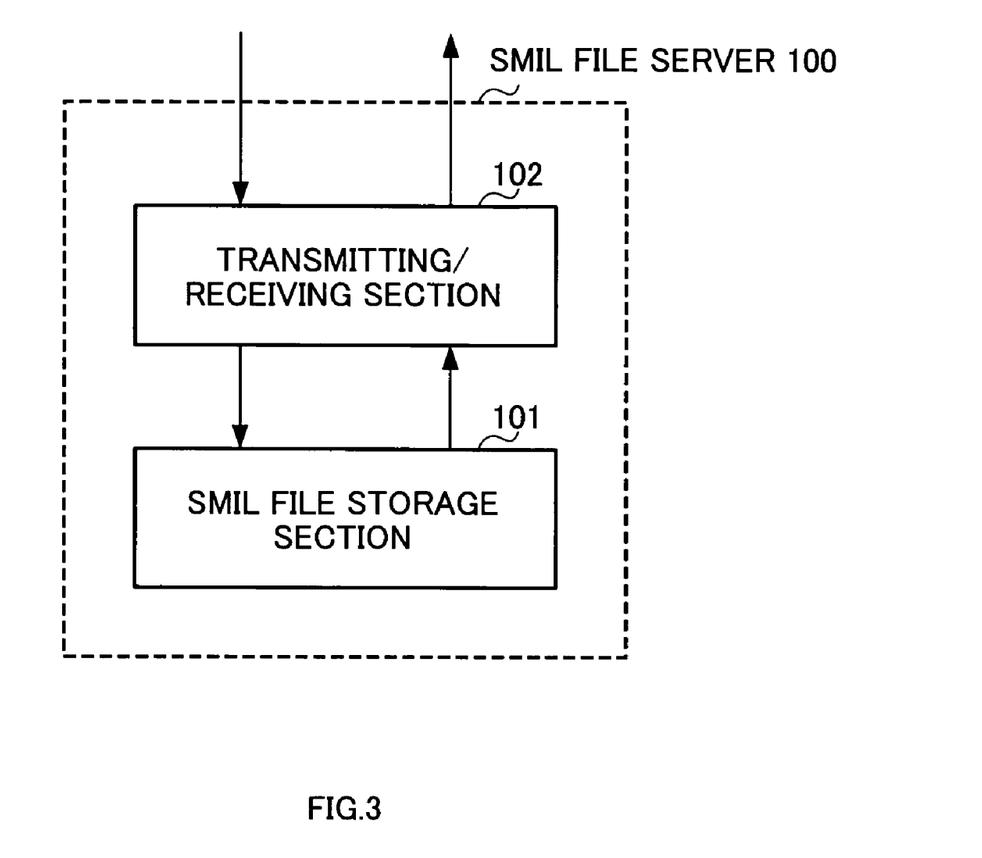
FIG. 3 is a block diagram showing the configuration of an SMIL file server according to Embodiment 1 of the present invention.

FIG. 3 is a block diagram showing the configuration of an SMIL file server 100 according to Embodiment 1 of the present invention. In this figure, an SMIL file storage section 101 stores for a client (media receiving apparatus) having a plurality of display sections of different resolution an SMIL file indicating layout in accordance with each display section.

A transmitting/receiving section 102 is connected to a client via a network, receives an SMIL file request from a client, reads the applicable SMIL file from SMIL file storage section 101, and transmits the read SMIL file to the client.

Figure 4A:
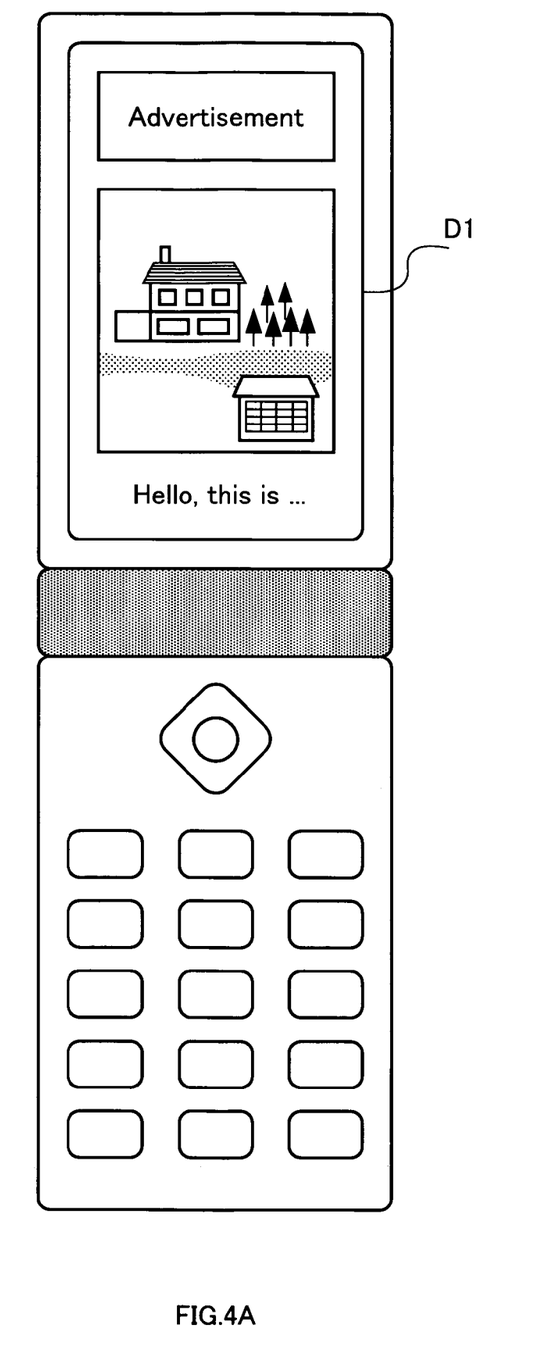
FIG. 4A a drawing showing a folding mobile phone open.
Figure 4B:
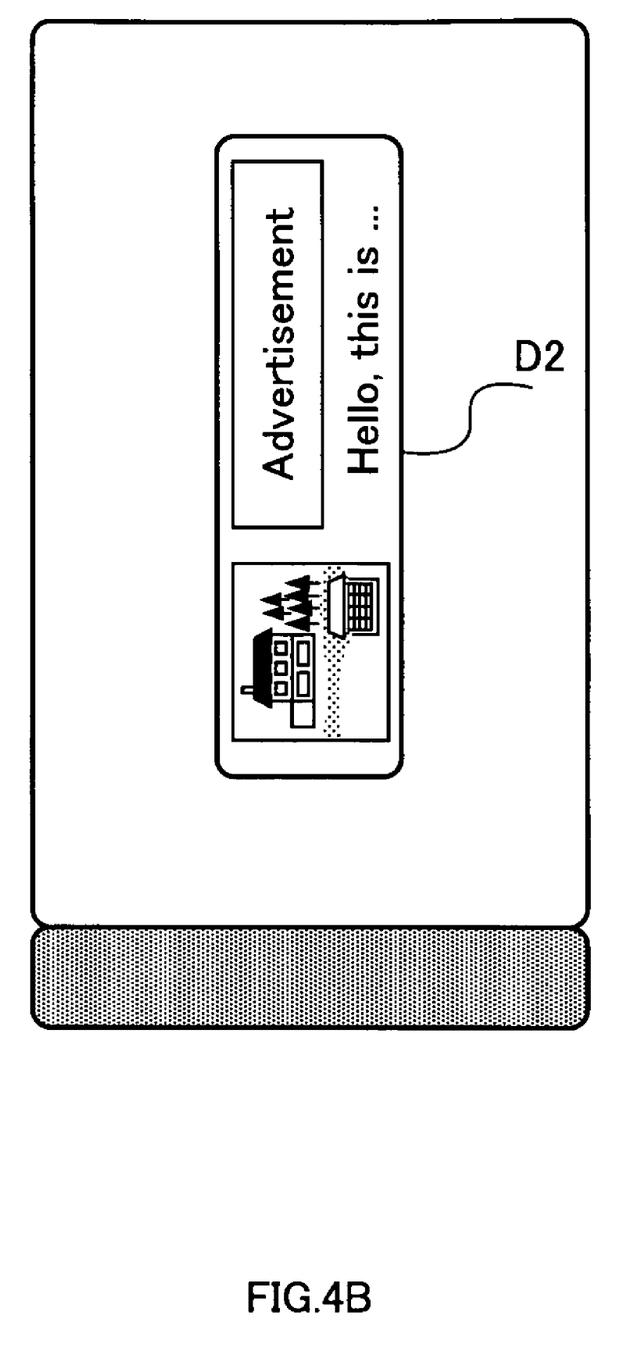
FIG. 4B a drawing showing a folding mobile phone closed.

In Embodiment 1 of the present invention, a description will be given taking the example of a folding mobile phone that has two display sections with different resolutions as a media receiving apparatus that is a client. FIG. 4A and FIG. 4B are drawings for explaining a folding mobile phone according to Embodiment 1 of the present invention. FIG. 4A shows a folding mobile phone open, and FIG. 4B shows a folding mobile phone closed. When the mobile phone is open as shown in FIG. 4A, a display section D1 is active, and when the mobile phone is closed as shown in FIG. 4B, a display section D2 is active. Thus, the open or closed state of the mobile phone is determined by the mode of use of the user, and the display section corresponding to that state becomes active. "Active" means a state in which the display section displays media.

In this embodiment, text data, still-image data, audio data, and video data are used as media data, and SDP (Session Description Protocol) data and SMIL data are used as program control information. Of the program control information, layout information is included in SMIL data.

Figure 5:
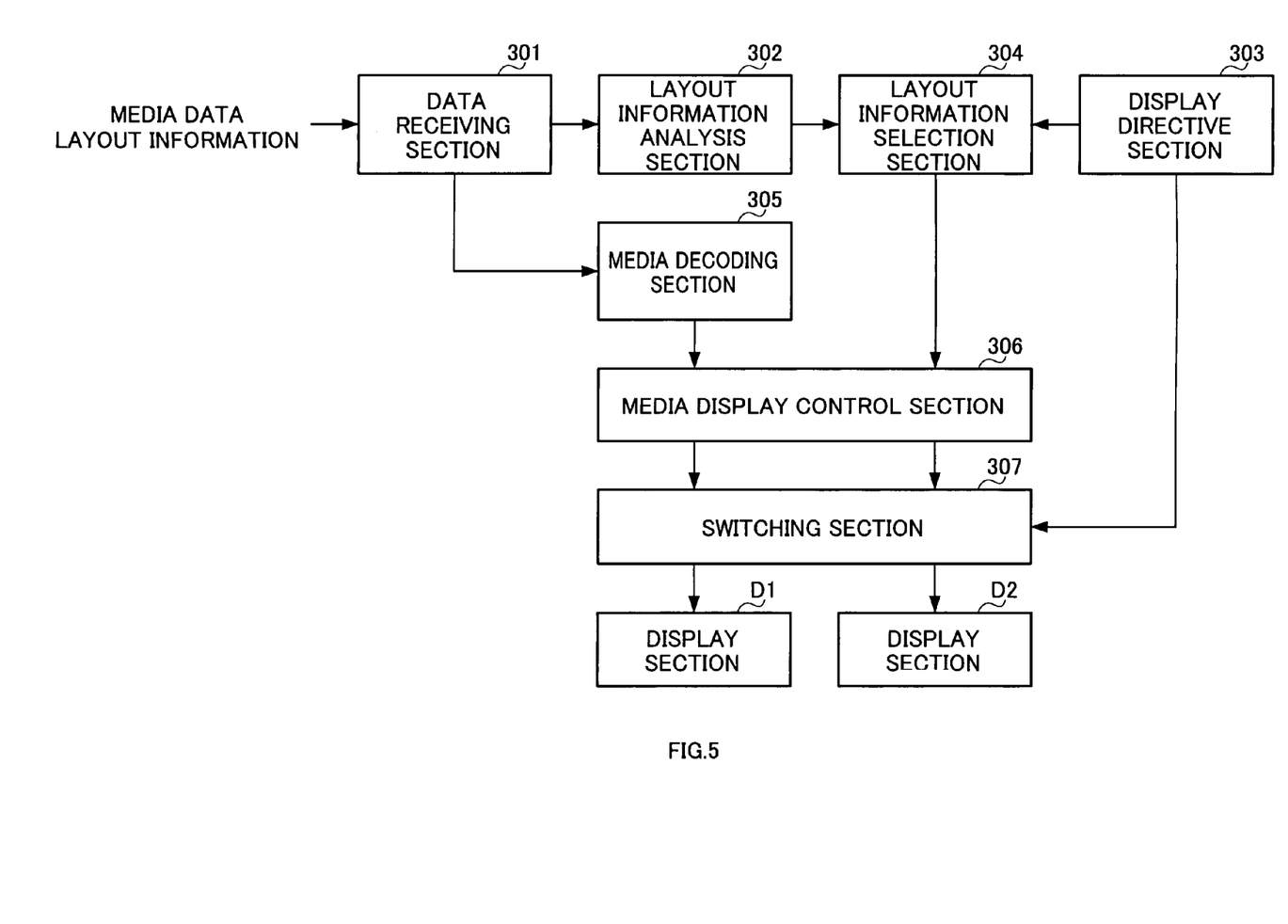
FIG. 5 is a block diagram showing the configuration of a folding mobile phone according to Embodiments 1 and 2 of the present invention.

FIG. 5 is a block diagram showing the configuration of a folding mobile phone according to Embodiment 1 of the present invention. In this figure, display sections D1 and D2 are LCDs (Liquid Crystal Displays) or the like, one of which becomes active in accordance with a user operation, and performs media display in accordance with a directive of a media display control section 306. Display sections D1 and D2 are assumed to represent display sections D1 and D2 in FIG. 4A and FIG. 4B respectively.

Data receiving section 301 receives layout information and media data from a server, which is a media distribution apparatus, via a radio channel or the like. Received layout information is output to layout information analysis section 302, and media data is output to a media decoding section 305.

Layout information analysis section 302 analyzes layout information output from data receiving section 301, and outputs the result of the analysis to a layout information selection section 304. Display directive section 303 detects the display section that becomes active in accordance with the mode of use of the user, and issues a directive to layout information selection section 304 and switching section 307 in accordance with the detected display section.

In accordance with the directive output from display directive section 303, layout information selection section 304 performs layout selection using the analysis result output from layout information analysis section 302, and outputs post-selection layout information to media display control section 306.

Media decoding section 305 decodes media data such as text data, still-image data, video data, voice data, or music data output from data receiving section 301, and outputs decoded data to media display control section 306.

Media display control section 306 positions media in accordance with the layout information output from layout information selection section 304, and at the same time performs conversion processing comprising media enlargement or reduction so as to conform to the area specified by the layout information, performs control to display the media, and outputs the control result to switching section 307.

Switching section 307 outputs the control result output from media display control section 306 to the active display section in accordance with the directive output from display directive section 303.

Figure 6:
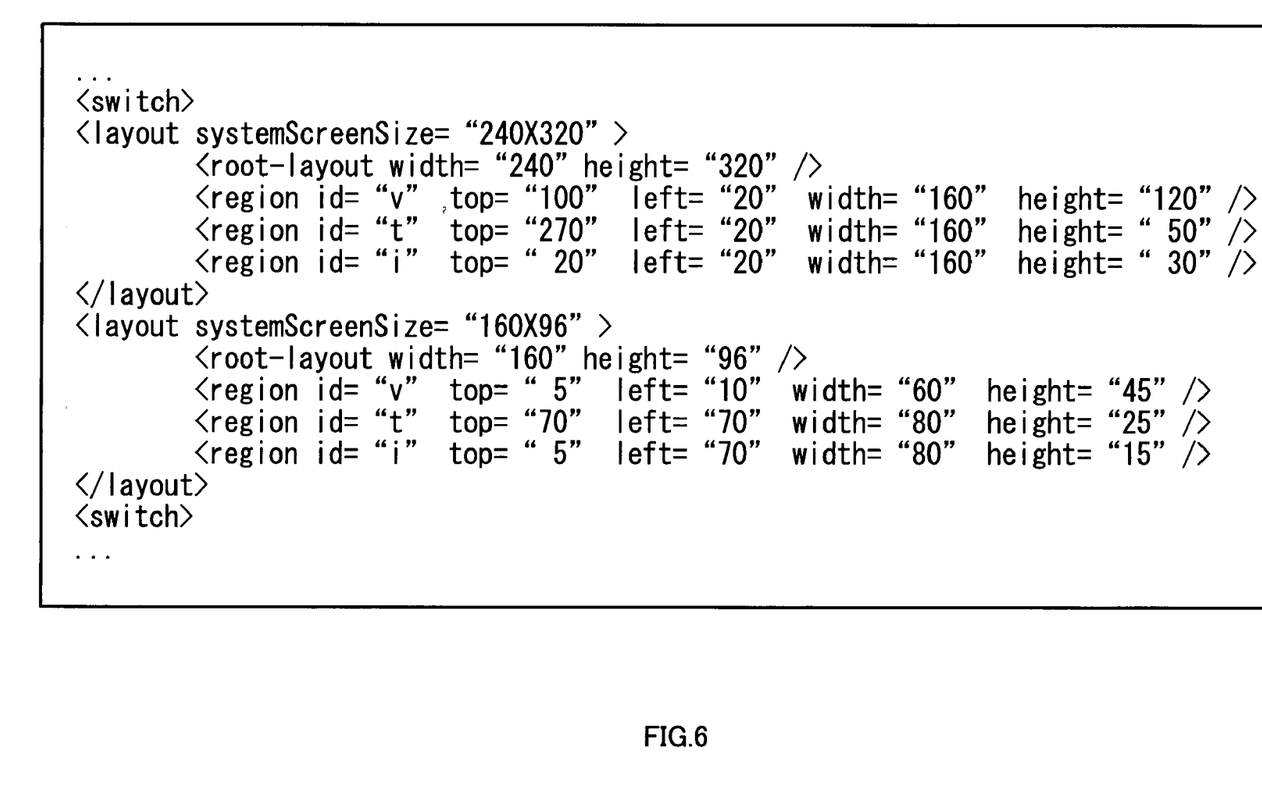
FIG. 6 is a drawing showing an example of an SMIL description according to Embodiment 1 of the present invention.

FIG. 6 is a drawing showing an example of an SMIL description according to Embodiment 1 of the present invention. Here, the resolutions of the two display sections are described as 240×320 pixels and 160×96 pixels.

In FIG. 6, in order to switch the layout in accordance with two resolutions, there are two areas enclosed by <layout> tags. Specifically, in the case of the first layout, 'systemScreenSize="240×320"' is specified, which specifies the layout when the display apparatus resolution is 240×320 pixels, and the display area of the display section—that is, the root-layout-is defined as 240×320.

Also, video data, text data, and still-image data regions are respectively defined as id="v", "t", "i". For example, as the id="v" region has top="100" and left="20", video data is displayed using a layout with the origin 20 pixels from the left of the root-layout and 100 pixels from the top.

Similarly, in the case of the second layout, 'systemScreenSize="160×96"' is specified, and the root-layout is "160×96".

Figure 7A:
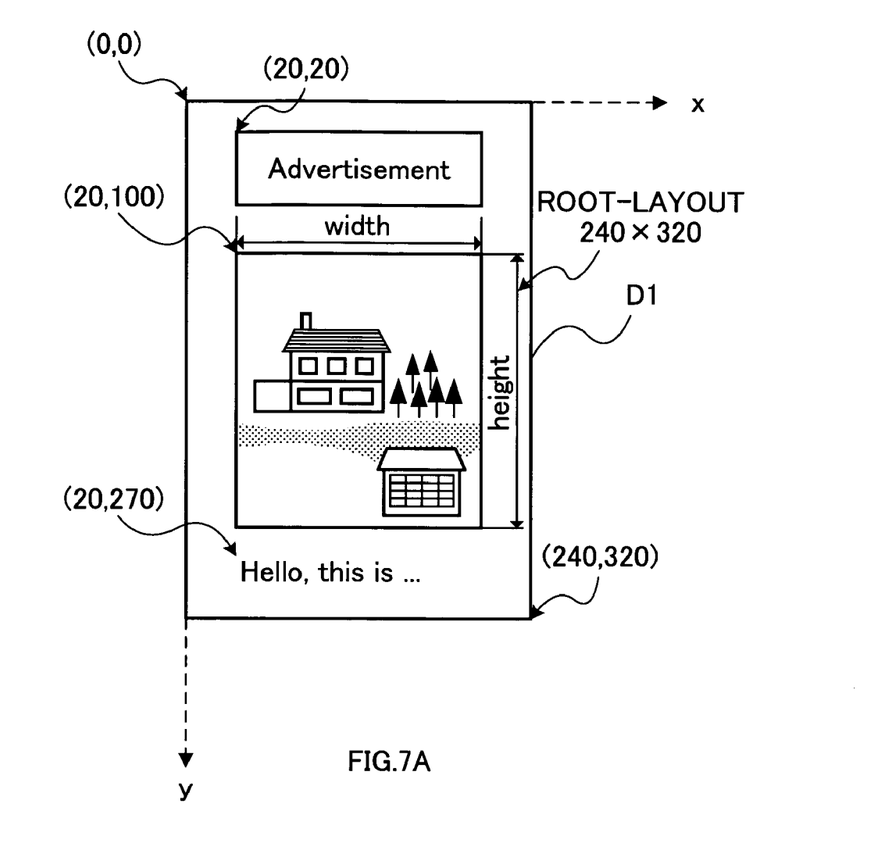
FIG. 7A is a drawing showing a display example when a folding mobile phone according to Embodiment 1 of the present invention is open.
Figure 7B:
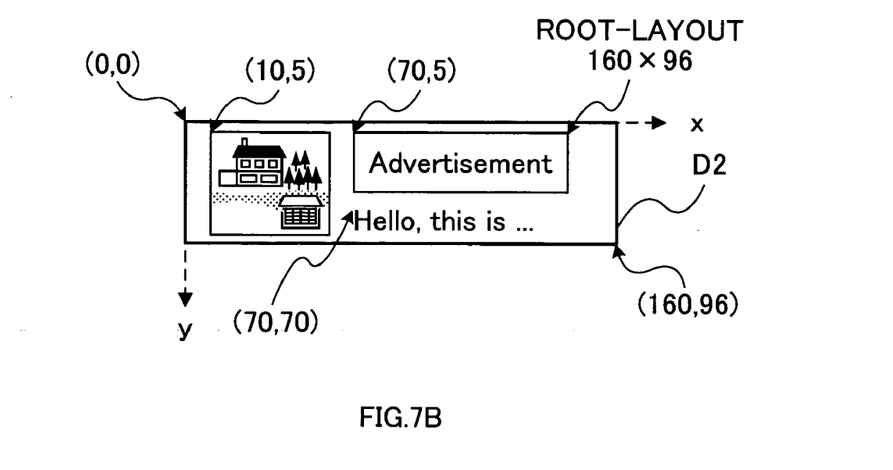
FIG. 7B is a drawing showing a display example when a folding mobile phone according to Embodiment 1 of the present invention is closed.

Next, actual display examples using the layout descriptions in FIG. 6 will be described using FIG. 7A and FIG. 7B. Display section D1 shown in FIG. 7A is an example of the display when the folding mobile phone is open, and display section D2 shown in FIG. 7B is an example of the display when the folding mobile phone is closed. To simplify the explanation, the top-left coordinates are assumed to be (0,0) for both display section D1 and display section D2, and the X-axis and Y-axis are defined as shown in FIG. 7A and FIG. 7B.

The root-layout for display section D1 shown in FIG. 7A is 240×320; the still-image data region is an area with coordinates (20,20) as the origin, 160 pixels in the X-axis direction (corresponding to "width" in the figure), and 30 pixels in the Y-axis direction (corresponding to "height" in the figure) (hereinafter denoted as "160×30"); the video data region is a 160×120 area with coordinates (20,100) as the origin; and the text data region is a 160×50 area with coordinates (20,270) as the origin.

The root-layout for display section D2 shown in FIG. 7B is 160×96; the still-image data region is an 80×15 area with coordinates (70,5) as the origin; the video data region is a 60×45 area with coordinates (10, 5) as the origin; and the text data region is an 80×25 area with coordinates (70,70) as the origin.

Since the display area is different for display section D1 and display section D2, media display control section 306 performs media enlargement or reduction from the original media resolution to coordinate with the area specified in SMIL. Here, media enlargement or reduction means enlargement or reduction for still-image data and video data, and a change of font size for text data.

The operation of a folding mobile phone that has the above-described configuration will now be described. When the folding mobile phone is open, active display section D1 is detected by display directive section 303, and a directive corresponding to display section D1 is conveyed to layout information selection section 304 and switching section 307. In layout information selection section 304, the display directive section 303 directive is received and the layout specified as 'systemScreenSize="240×320"' in SMIL is selected from the received layout information. In media display control section 306, positioning and enlargement or reduction of each media is performed based on the layout selected by layout information selection section 304, and media data is displayed on display section D1 via switching section 307.

On the other hand, when the folding mobile phone is closed, active display section D2 is detected by display directive section 303, and a directive corresponding to display section D2 is conveyed to layout information selection section 304 and switching section 307. In layout information selection section 304, the display directive section 303 directive is received and the layout specified as 'systemScreenSize="160×96"' in SMIL is selected from the received information. In media display control section 306, positioning and enlargement or reduction of each media is performed based on the layout selected by layout information selection section 304, and media data is displayed on display section D2 via switching section 307.

Thus, according to this embodiment, one or other display section of a folding mobile phone having two display sections with different resolutions becomes active according to whether the folding mobile phone is open or closed, and media displayed on the display section set as active are enlarged or reduced, and their positioning changed, based on layout information corresponding to the relevant display section, thereby making it possible to prevent media from being displayed in an invalid display area, or a program from being temporarily stopped, even when an active display section displaying real-time media is switched to another display section with different resolution in accordance with the mode of use of the user.

In this embodiment, display section resolutions have been described as 240×320 pixels and 160×96 pixels, but resolutions are not limited to these, and display sections may have any resolution.

In this embodiment, an SMIL file server receives an SMIL file request from a client, reads the relevant SMIL file from SMIL file storage section 101, and transmits the read SMIL file to the client, but this is not a limitation, and an SMIL file may be unilaterally transmitted to a client periodically regardless of whether or not there is a request from the client.

Embodiment 2

In Embodiment 1, a case has been described in which two display sections with different resolutions display the same media. In Embodiment 2, a case will be described in which media displayed by two display sections partially coincide or differ.

The configuration of a folding mobile phone according to this embodiment is the same as in FIG. 5, and therefore FIG. 5 will be referred to here, and a detailed description thereof will be omitted.

Figure 8:
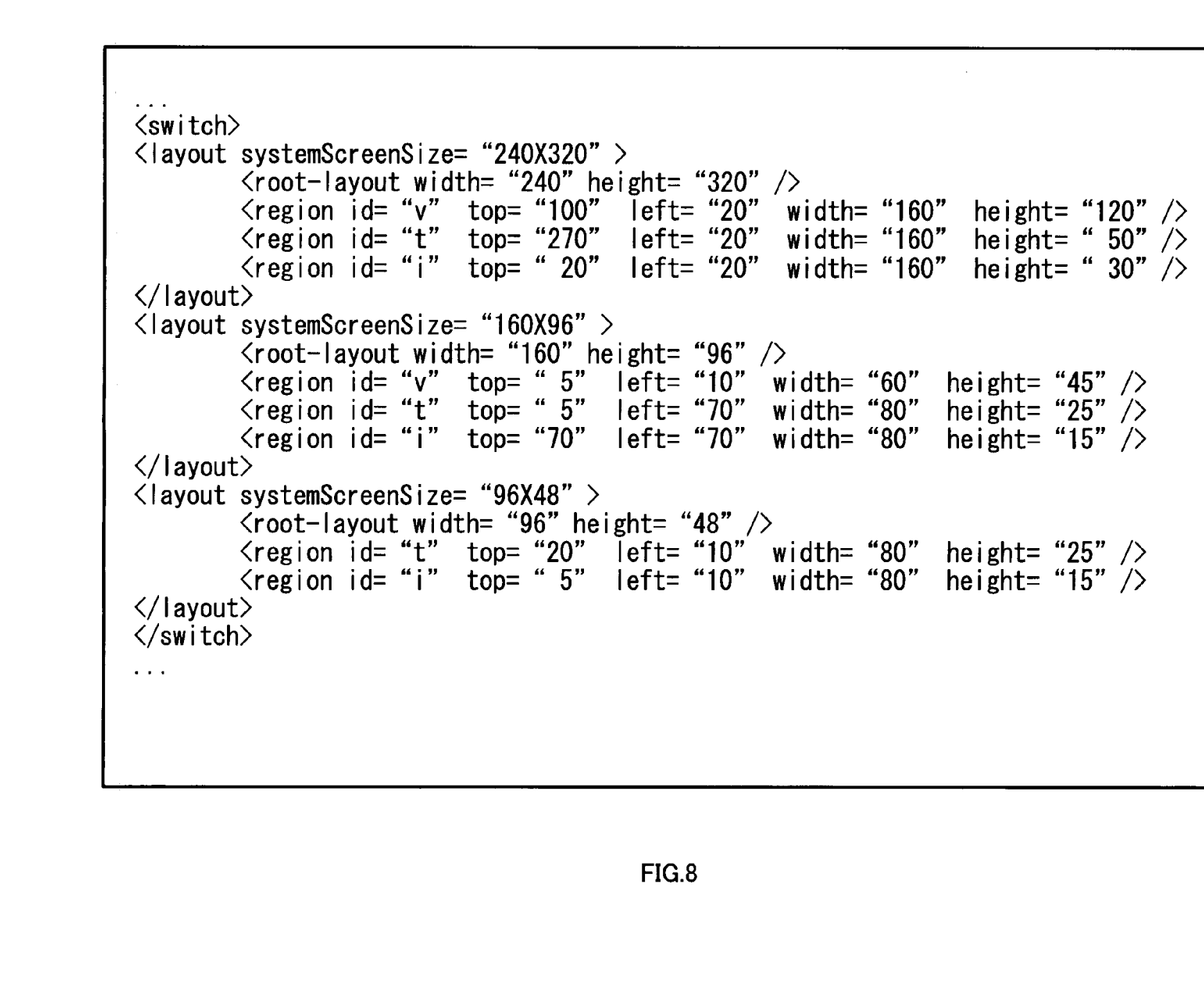
FIG. 8 is a drawing showing an example of an SMIL description according to Embodiment 2 of the present invention.

FIG. 8 is a drawing showing an example of an SMIL description according to Embodiment 2 of the present invention. In FIG. 8, there are three areas enclosed by <layout> tags so that the layout can be switched in accordance with three resolutions. The first two layouts are the same as in Embodiment 1, and therefore a detailed description thereof is omitted here. The third layout has a specification of 'systemScreenSize="96×48"', and is specified for a display section having a 96×48 resolution. As this layout has a lower resolution than the first two layouts, only areas for two kinds of media are reserved: namely, still-image data and text data. This is because, when there is a great difference between the resolutions of two display sections provided on a folding mobile phone, media that can be displayed by a high-resolution display section not be recognizable by a user on a low-resolution display section even after reduction and positioning modification have been carried out.

Figure 9A:
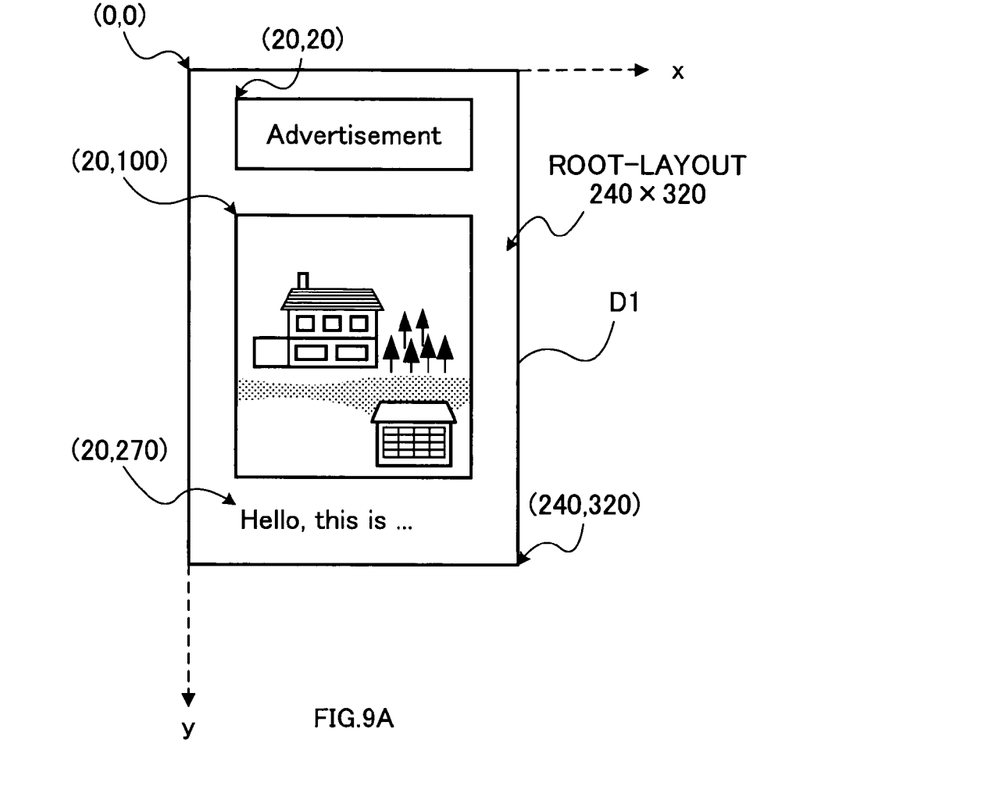
FIG. 9A is a drawing showing a display example when a folding mobile phone according to Embodiment 2 of the present invention is open.
Figure 9B:
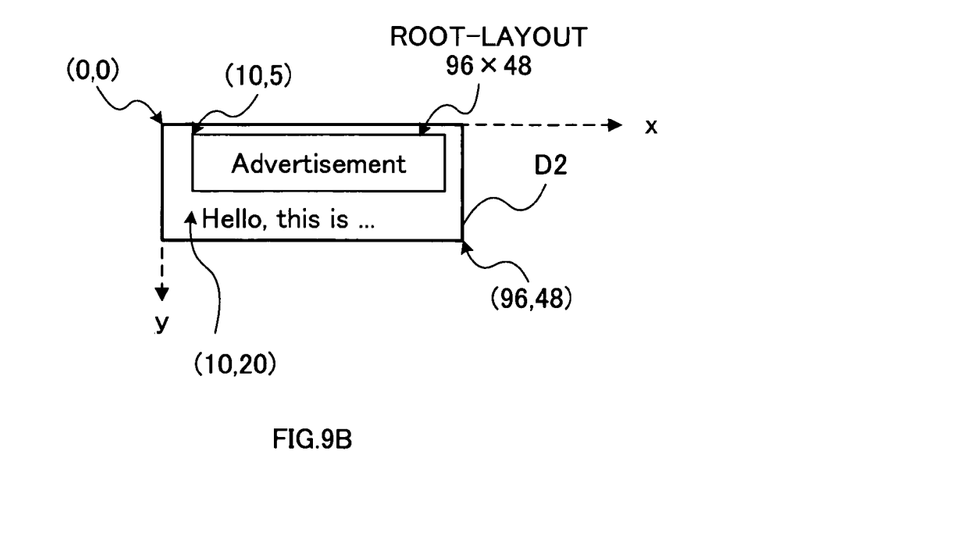
FIG. 9B is a drawing showing a display example when a folding mobile phone according to Embodiment 2 of the present invention is closed.

Next, actual display examples using the layout descriptions in FIG. 8 will be described using FIG. 9A and FIG. 9B. Display section D1 shown in FIG. 9A is an example of the display when the folding mobile phone is open, identical to that in FIG. 7A, and therefore a detailed description is omitted here. Display section D2 shown in FIG. 9B is an example of the display when the folding mobile phone is closed, having a 96×48 resolution. To simplify the explanation, the top-left coordinates are assumed to be (0,0) for both display section D1 and display section D2, and the X-axis and Y-axis are defined as shown in FIG. 9A and FIG. 9B.

When display section D1 is active—that is, when the folding mobile phone is open—layout information selection section 304 shown in FIG. 5 selects the 240×320 resolution described first in FIG. 8 from the layouts specified in SMIL. In this case, the content actually displayed is identical to that in Embodiment 1.

Then, when display section D2 is active—that is, when the folding mobile phone is closed—layout information selection section 304 shown in FIG. 5 selects the 96×48 resolution described third in FIG. 8 from the layouts specified in SMIL.

The second layout 'systemScreenSize="160×96"' in the SMIL description for a display section with a 160×96 resolution is not used by a folding mobile phone according to this embodiment, but is used by a folding mobile phone that has the corresponding resolution.

In the SMIL description in FIG. 8, only text data and still-image data are specified in the third layout, and there is no SMIL specification for a video data region, and therefore only text data and still-image data are displayed by the display section, and video data is not displayed. The amount of processing of the media receiving apparatus can thus be reduced since video data requiring a large amount of processing need not be displayed. The still-image data region is an 80×15 area with coordinates (10,5) as its origin, and the text data region is an 80×25 area with coordinates (10,20) as its origin. Still-image data and text data are displayed enlarged or reduced to fit the respective areas.

Thus, according to this embodiment, SMIL is prepared such that media displayed by a high-resolution display section and media displayed by a low-resolution display section comprising two display sections provided on a folding mobile phone partially coincide or differ, thereby making it possible to prevent media from being displayed in an invalid display area, or a program from being temporarily stopped, even when there is a great difference in the resolutions of the two display sections.

In this embodiment, display section resolutions have been described as 240×320 pixel and 96×48 pixels, but resolutions are not limited to these, and display sections may have any resolution. Also, a case has been described in which three layouts of 240×320 pixels, 160×96 pixels, and 96×48 pixels are described in SMIL, but the present invention is not limited to this case, and layouts of any size may be specified, and furthermore the number of specified layouts may also be less than three or more than three.

In this embodiment, video data has been cited as media data not displayed by a low-resolution display section, but the present invention is not limited to this case, and provision may be made for either still-image data or text data not to be displayed instead of video data. In the case of character data, not only the font size but also the font type may be changed as appropriate.

When voice data or music data is specified, provision may be made for voice data or music data not to be selected when the media receiving apparatus is closed, and for voice data or music data to be played back when the media receiving apparatus is open. By this means, if voice data or music data is to be played back together with video, for example, and video is selected when the media receiving apparatus is open, effective playback matching voice data or music data to video can be performed. On the other hand, if the media receiving apparatus becomes closed through a change of the user's mode of use and video is no longer displayed, power consumption necessary for voice data or music data playback can be suppressed by suspending voice data or music data playback. Furthermore, when the media receiving apparatus becomes open again and video is played back after voice data and music data playback is suspended, voice data or music data is also restarted together with video. This case is also taken as the start of voice data or music data.

Also, if JAVA® program data is specified, provision may be made for JAVA® program data not to be selected when the media receiving apparatus is closed, and for JAVA® program data to be executed when the media receiving apparatus is open. Program data is not limited to JAVA® program data.

Embodiment 3

In Embodiment 3 of the present invention, a case will be described in which it is determined whether or not a video region is to be displayed when there are not a plurality of layout specifications in an SMIL file.

Figure 10:
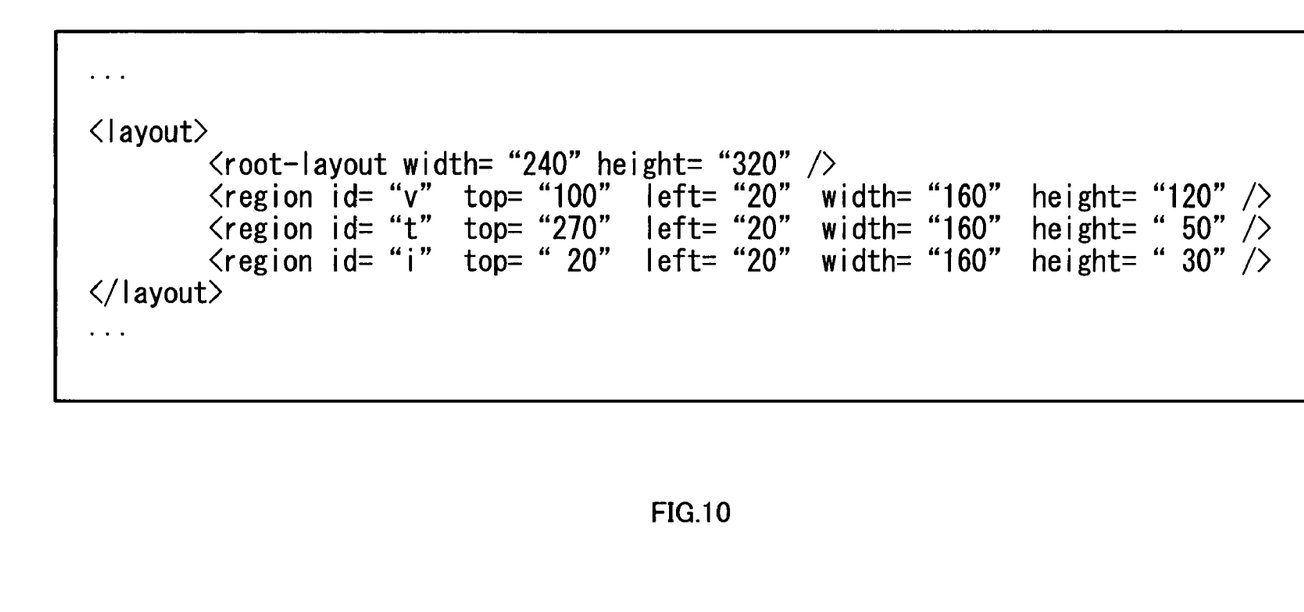
FIG. 10 is a drawing showing an example of an SMIL description according to Embodiment 3 of the present invention.

FIG. 10 is a drawing showing an example of an SMIL description according to Embodiment 3 of the present invention. In this figure, the root-layout has a width of 240 pixels and a height of 320 pixels, providing for a display section with 240×320 resolution. The area in which video data is displayed is 160 pixels wide and 120 pixels high, with coordinates (20,100) as the origin.

In Embodiment 3, display section D1 has 240×320 resolution and display section D2 has 96×48 resolution, as in FIG. 9A and FIG. 9B of Embodiment 2. The coordinates are the same as in Embodiment 1.

As the resolution of display section D2 is 96×48, it is smaller than the '240×320' root-layout. It is therefore necessary to reduce the entire layout when performing display on display section D2.

The method of determining whether or not video is to be displayed will now be explained. The video region is originally specified in SMIL, and is known to be 160 pixels in width and 120 pixels in height. On the other hand, the resolution of display section D2 is 96 pixels in width and 48 pixels in height. Therefore, the image must be reduced when displaying video on display section D2. Since video image reduction increases the processing load, video is not displayed in order to avoid this. That is to say, whether or not video is displayed is determined by making a size comparison between the specified video region and the display resolution, and video is not displayed if the specified video region is larger than the display resolution. By this means, power consumption required for video image reduction processing can be suppressed, and the operating time of a mobile phone or the like operating on an internal power source can be extended.

The comparison is performed between the size of the video region specified in SMIL and the resolution of display section D2, but the comparison is not limited to this, and the size of the video region specified in SMIL may also be compared with the video region size when the root-layout specified in SMIL is reduced in display section D2.

Thus, according to this embodiment, video image reduction processing is made unnecessary by making the video region invalid when the specified video region is larger than the display resolution, enabling power consumption to be suppressed and operating time to be extended.

In the above-described embodiments, a folding mobile phone has been used as a media receiving apparatus, but the present invention is not limited to this, and a PDA type information terminal or the like may also be used, for example.

In the above-described embodiments, the display section is switched according to whether a folding mobile phone is open or closed, but the present invention is not limited to this, and may also be applied to a case where the display section of a mobile phone is switched (rotated) between the vertical direction and horizontal direction, for example. That is to say, provision may also be made for the resolution to be switched each time the display section rotates through a predetermined angle. And the predetermined angle may be considered to be 90 degrees. Thus, the term "resolution" used in the Description and Claims sections is assumed also to include the concept of "vertical/horizontal ratio of resolution."

The concept of "resolution switching" also includes a case where it becomes necessary for a single display section D currently displaying media data to display other display data, and switchover is performed so that the media data that was being displayed by display section D is displayed at low resolution in a part of display section D.

In the above-described embodiments, SMIL is used for layout descriptions, but the present invention is not limited to this, and layouts may be described by any description method.

A first aspect of a media receiving apparatus of the present invention has a configuration that includes a display section for which resolution switching is possible, a receiving section that receives one or more media data and a plurality of layout information items, a layout information selection section that selects layout information corresponding to the resolution displayed by the aforementioned display section from the aforementioned layout information, and a media display control section that performs control to perform media data selection and/or conversion processing based on the layout information selected by the aforementioned layout information selection section and display media data on a display section of applicable resolution.

According to this configuration, when the resolution of a display section displaying media data is switched, media data selection and/or conversion processing is performed based on layout information corresponding to the resolution switched to, thereby making it possible to prevent media data from being positioned in an invalid area of the display section, or viewing of a program from being temporarily stopped.

A second aspect of a media receiving apparatus of the present invention has a folding form, wherein the aforementioned display section has a configuration that includes a first display section that performs display when the aforementioned media receiving apparatus is in an open state, and a second display section that has a different resolution from the first display section and performs display when the aforementioned media receiving apparatus is in a closed state.

According to this configuration, when, for example, switching is performed from a first display section that is displaying data in the open state to a second display section that performs display in the closed state, media data selection and/or conversion processing is performed based on layout information corresponding to the resolution of the second display section, thereby making it possible to prevent media data from being positioned in an invalid area of the second display section, or viewing of a program from being temporarily stopped.

A third aspect of a media receiving apparatus of the present invention has a configuration whereby, in an above-described configuration, the aforementioned display section rotates and resolution is switched every predetermined angular rotation.

According to this configuration, the display section rotates, and even when the vertical and horizontal resolution components are switched around, for example, media data selection and/or conversion processing is performed based on layout information corresponding to the resolution, thereby making it possible to prevent media from being positioned in an invalid area of the display section, or viewing of a program from being temporarily stopped.

A fourth aspect of a media receiving apparatus of the present invention has a configuration whereby, in an above-described configuration, the aforementioned media display control section starts or suspends playback of voice data and/or music data among media data according to the resolution of the display section that performs display.

According to this configuration, if voice data and/or music data is to be played back together with video, for example, and video is selected according to the resolution of the display section that performs display, effective playback matching voice data or music data to video can be performed. On the other hand, if the resolution of the display section performing display is switched and video is no longer displayed, power consumption necessary for voice data and/or music data playback can be suppressed by suspending voice data and/or music data playback.

A server apparatus of the present invention has a configuration that includes a storage section that stores a plurality of layout information items used by a media receiving apparatus that has a display section for which resolution switching is possible, and a transmitting/receiving section that transmits layout information stored in the aforementioned storage section to the aforementioned media receiving apparatus in accordance with a request from the aforementioned media receiving apparatus.

According to this configuration, when a layout information request is received from a media receiving apparatus that has a display section for which resolution switching is possible, layout information is transmitted, thereby enabling the media receiving apparatus to make a layout change based on layout information even when the resolution of the display section displaying media data is switched.

A media receiving method of the present invention includes a display step for which resolution switching is possible, a receiving step of receiving one or more media data and a plurality of layout information items, a layout information selecting step of selecting layout information corresponding to the resolution displayed by a display section from the aforementioned layout information, and a media display control step of performing control to perform media data selection and/or conversion processing based on the layout information selected in the aforementioned layout information selecting step and display media data in a display step of applicable resolution.

According to this method, when the resolution of a display section displaying media data is switched, media data selection and/or conversion processing is performed based on layout information corresponding to the resolution switched to, thereby making it possible to prevent media data from being positioned in an invalid area of the display section, or viewing of a program from being temporarily stopped.

A media distribution system of the present invention has a configuration including a media distribution apparatus that distributes one or more media data and a plurality of layout information items to a media receiving apparatus via a network, and a media receiving apparatus that comprises a receiving section that receives the media data and layout information distributed from said media distribution apparatus, a display section for which resolution switching is possible, a layout information selection section that selects layout information corresponding to a resolution displayed by said display section from said layout information and a media display control section that performs control to perform media data selection and/or conversion processing based on the layout information selected by said layout information selection section and display the media data on a display section of applicable resolution.

According to this configuration, when the resolution of a display section displaying media data is switched, media data selection and/or conversion processing is performed based on layout information corresponding to the resolution switched to, thereby making it possible to prevent media data from being positioned in an invalid area of the display section, or viewing of a program from being temporarily stopped.

The present application is based on Japanese Patent Application No. 2003-313741, filed on Sep. 5, 2003, the entire content of which is expressly incorporated herein by reference.

INDUSTRIAL APPLICABILITY

A media receiving apparatus, media receiving method, and media distribution system according to the present invention have an effect of preventing a media receiving apparatus from displaying media in an invalid area, or temporarily stopping a program, and can be applied to a mobile phone or an information terminal apparatus such as a PDA.

The invention claimed is:

1. A display apparatus comprising:
a plurality of display sections that have different resolutions for displaying media data, wherein the media data comprise still-image data and/or video data;
a display directive section that detects a display section that becomes active in accordance with a mode of use of the display apparatus out of the plurality of display sections;
a position information selection section that selects position information matching a resolution of the detected display section from a plurality of position information items, the plurality of position information items being received from a transmitter, and at least one of the position information items including position information relating to still-image data and video data and at least another one of the position information items including position information relating to only one of still-image data and video data; and
a media display control section that performs selection and/or conversion processing of media data and performs control to display the media data on the detected display section, based on the selected position information, wherein:
the position information comprises information of a position to which the still-image data and/or the video data is arranged; and
the media display control section displays the still-image data and/or the video data at the position specified by the selected position information.

2. A display apparatus comprising:
a display including a first display section and a second display section that have different resolutions for displaying media data;
a display directive section that detects one of the first display section and the second display section that becomes active in accordance with a mode of use of the display apparatus;
a reception section that receives position information items from a transmitter, the position information items including a first position information item that matches the resolution of the first display section and a second position information item that matches the resolution of the second display section;
a position information selection section that selects one of the first position information item and the second position information item in accordance with the one of the first display section and the second display section detected by the display directive section, the first position information item and the second position information item being received from a transmitter, and at least one of the first position information item and the second position information item including position information relating to still-image data and video data and at least another one of the first position information item and the second position information item including position information relating to only one of still-image data and video data; and
a media display control section that performs selection processing and/or conversion processing of media data and performs control to display the media data on the detected one of the first display section and the second display section, based on the selected one of the first position information item and the second position information item, wherein:
the media data comprises still-image data and/or video data;
each of the first position information item and the second position information item comprises information of a position to which the still-image data and/or the video data is arranged; and
the media display control section displays the still-image data and/or the video data at the position specified by the selected one of the first position information item and the second position information item.

* * * * *